United States Patent
Singh et al.

(10) Patent No.: US 11,941,320 B2
(45) Date of Patent: Mar. 26, 2024

(54) ELECTRONIC MONITORING SYSTEM HAVING MODIFIED AUDIO OUTPUT

(71) Applicant: Arlo Technologies, Inc., Carlsbad, CA (US)

(72) Inventors: Rajinder Singh, San Jose, CA (US); John Thomas, Carlsbad, CA (US); Michael Harris, Oceanside, CA (US); Dennis Aldover, Carlsbad, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 274 days.

(21) Appl. No.: 17/487,824

(22) Filed: Sep. 28, 2021

(65) Prior Publication Data

US 2023/0094942 A1 Mar. 30, 2023

(51) Int. Cl.
  G06F 3/16 (2006.01)
  G06F 18/2431 (2023.01)
  G06T 7/20 (2017.01)
  G06V 20/40 (2022.01)
  H04R 1/08 (2006.01)

(52) U.S. Cl.
  CPC .......... *G06F 3/165* (2013.01); *G06F 18/2431* (2023.01); *G06T 7/20* (2013.01); *G06V 20/41* (2022.01); *H04R 1/08* (2013.01); *G06T 2207/10016* (2013.01); *G06V 20/44* (2022.01); *H04R 2430/01* (2013.01)

(58) Field of Classification Search
  CPC ........ G06F 3/165; G06F 3/16; G06F 18/2431; G06V 20/41; G06T 7/20; H04R 1/08
  See application file for complete search history.

(56) References Cited

U.S. PATENT DOCUMENTS

| | | |
|---|---|---|
| 8,682,034 B2 | 3/2014 | Garoutte |
| 9,247,204 B1 | 1/2016 | Yin et al. |
| 9,635,323 B2 | 4/2017 | Carter |
| 9,743,033 B2 | 8/2017 | Kim et al. |
| 9,762,963 B2 | 9/2017 | Jarman et al. |
| 9,882,736 B2 | 1/2018 | Lett |
| 10,091,017 B2 | 10/2018 | Landow et al. |
| 10,133,542 B2 | 11/2018 | Bowling |
| 10,621,442 B2 | 4/2020 | Matsuoka et al. |
| 10,924,850 B2 | 2/2021 | Laaksonen et al. |
| 11,462,235 B2 * | 10/2022 | Kang ................... H04R 1/406 |
| 11,527,265 B2 * | 12/2022 | Peleg ................... G06V 10/764 |

(Continued)

FOREIGN PATENT DOCUMENTS

| | | |
|---|---|---|
| EP | 3025314 | 6/2016 |
| JP | 2015029241 | 2/2015 |

*Primary Examiner* — Olisa Anwah
(74) *Attorney, Agent, or Firm* — Boyle Fredrickson S.C.

(57) ABSTRACT

An electronic monitoring system has one or more imaging devices that can detect at least one triggering event comprising sound and motion and a controller that executes a program to categorize the triggering event as being located in a user-defined activity zone within the field of view and/or as being a taxonomic-based triggering event. Upon categorizing the triggering event, the system generates an output comprising a video component and an audio component. At least a portion of the audio component is modified if the triggering event is a categorized triggering event. Modification of the audio may include muting all or a portion of the audio component of the output.

20 Claims, 5 Drawing Sheets

(56) References Cited

U.S. PATENT DOCUMENTS

| | | | |
|---|---|---|---|
| 11,615,623 B2* | 3/2023 | Khadloya | G06T 7/248 |
| | | | 382/103 |
| 2013/0107028 A1* | 5/2013 | Glei ner | H04R 3/005 |
| | | | 348/77 |
| 2016/0316293 A1 | 10/2016 | Klimanis | |
| 2016/0364397 A1* | 12/2016 | Lindner | G06F 40/205 |
| 2018/0190090 A1 | 7/2018 | Ardo et al. | |
| 2018/0268240 A1* | 9/2018 | Loce | G06F 21/6254 |
| 2019/0019295 A1* | 1/2019 | Lehtiniemi | G06T 7/11 |
| 2019/0349551 A1* | 11/2019 | Mughal | H04R 1/406 |
| 2019/0377901 A1* | 12/2019 | Balzer | H04L 63/0421 |
| 2020/0013266 A1 | 1/2020 | Lemberger et al. | |
| 2020/0288045 A1* | 9/2020 | Jeong | H05K 1/144 |
| 2020/0388139 A1 | 12/2020 | Saha et al. | |
| 2021/0043066 A1* | 2/2021 | Wright | G08B 25/007 |
| 2022/0172700 A1* | 6/2022 | Xiong | G06V 20/52 |
| 2022/0335816 A1* | 10/2022 | Dice | G08B 21/18 |

* cited by examiner

ELECTRONIC MONITORING SYSTEM HAVING MODIFIED AUDIO OUTPUT

BACKGROUND OF THE INVENTION

1. Field of the Invention

The present invention relates to an electronic monitoring system and method, and more particularly, to an electronic monitoring system and method in which detection of a triggering event generates a modified output. More specifically, the present invention relates to modifying at least a portion of the audio component of an output from an electronic monitoring system.

2. Discussion of the Related Art

Cameras have long been used as part of monitoring and/or surveillance systems. More recently, cameras have been coupled with electronic sensors to detect triggering events, such as a detected motion, to allow recording of an area once a triggering event has occurred. Video cameras have also been connected to computers with network access to allow a user to remotely monitor an area with a user device such as a laptop or desktop computer, a smart phone or tablet computer. In such systems, automatic notifications can be sent to alert a user of a user device of an event of interest occurring within the field of view of the camera and/or electronic sensor. Upon receiving the notification, the user can access a live or prerecorded output signal from data captured at the camera and/or electronic sensor. Typically, such output signals include both the video and audio data captured at the camera and/or electronic sensor.

However, in such systems, it may be undesirable for a user to obtain a complete or unaltered audio component of the output signal. For example, the user may not wish to broadcast a loud or otherwise potentially disruptive audio component of the output signal when in a social setting. Alternatively, if the audio component of the triggering event that initiated the notification of activity in the field of view of the camera and/or electronic sensor is generally known to be undesirable or otherwise of no interest to the user, the user may wish not to receive the audio component with the output signal. For example, if the triggering event was a barking dog, the user may wish to omit and/or reduce the volume of the audio component within the output signal because the sound of a barking dog, at best, would be considered to add nothing useful to the displayed message and, more likely, would be annoying to the user and those in the vicinity of the user. Alternatively, in some settings, the user of the electronic monitoring system may wish to receive only portions of the audio component of the output signal that originate within a predetermined activity zone, such that other portions of the audio component of the output signal are muted or deemphasized. For example, the user may wish to receive the audio from an individual speaking near a doorbell in the foreground of the field of view, while simultaneously muting-traffic related noises originating on a street near the background. What is needed is an improved system and/or method that eliminates one or more of the foregoing disadvantages and provides an output signal that includes a modified audio component of the captured signal.

SUMMARY OF THE INVENTION

In one aspect, the invention can provide an electronic monitoring system having at least one imaging device configured to detect a triggering event within a monitored area and concurrently capture data corresponding to the occurrence of that triggering event. The triggering event may, for example, be a motion or sound. The monitored area may be the field of view of a camera of the imaging device. A controller, in communication with the imaging device, can cause an output to be to a user device. The output comprises a video component and an audio component. The controller is configured to determine if the audio component is from a classified triggering event and if so, to cause a the volume of the audio component as played by the user device to be modified. The classified triggering event may, for example, be an activity-zone based triggering event occurring in a user defined activity zone and/or a taxonomic-based triggering event generated by a specified genus, sub-genus, or species of objects as recognized by the video component of the monitoring device.

In one aspect, a modification of the audio portion of the output may include muting at least a portion of the audio data captured from the imaging device corresponding to the classified triggering event. Similarly, a modification of the audio portion of the output may include muting at least a portion of the audio data captured from the imaging device that does not correspond to the classified triggering event, such that the portion of the audio component correspond to the classified triggering event is provided in the output. Similarly, the volume of the portion of the audio component subject to modification may altered, i.e., increased or decreased, rather than fully muted.

An activity zone corresponding to a activity-zone based triggering event can be any digital representation of a physical area, e.g., geofenced area, in which a triggering event occurs and in which an imaging device is configured to record upon the triggering event occurring. For example, a field of view of a camera could be an activity zone corresponding to a triggering event, whether the triggering event is detected by a motion sensor, an RF sensor, or something else entirely. Similarly, a distance within an audible range of a microphone could also be an activity zone corresponding to a triggering event. Furthermore, a portion or subset of the field of view of the camera and/or audio range of the microphone could also be an activity zone, as predetermined by the user through a user interface with a program.

In the case of a taxonomic-based triggering event, the triggering may be categorized as either a genus level triggering event and/or a species level triggering event. The terms "genus" and "species" as used herein simply refer to a set and a subset of that set respectively. There can be various levels of genus and species. For example, a person can be considered a genus and a delivery person could be species within that genus. Or further, a mail carrier could be a species of the genus delivery person. Still a level further, a specific individual could be a species of the genus mail carrier. The levels between the uppermost level levels and the bottom-most level also could be considered "subgenuses." For the sake of simplicity, unless otherwise noted in a particular example, the term "genus" will encompass both genuses and sub-geneses. By providing event details in the nature of genius and/or species level classification of the triggering event, custom audio modification may be applied to the output signal such as an audio indication of the triggering event, the monitoring system can be greatly improved.

A species level triggering event can, for example, be detection of a specified person, detection of a specified vehicle, detection of a specified animal, detection of a package, detection of a specified sound, or detection of motion within a specified area within a field of view of the imaging device.

A genus level triggering event can, for example be, detection of an unspecified person, detection of an unspecified vehicle, detection of an unspecified animal, detection of unspecified motion, detection of an unspecified sound, or detection of motion within an unspecified area within the field of view of the imaging device.

Accordingly, in another aspect, the invention can provide an executable program within the system that is operable to access an audio file from a database associated with the genius or species level categorized triggering event and to modify the volume of the portion of the audio component within the output when the sound recorded at the imaging device corresponds to the accessed audio file.

More specifically, in one aspect, the invention can provide an improved user experience for an electronic monitoring or surveillance system and/or process in which an audio/video output is provided on an application based "computer device", such as a Personal Data Assistant ("PDA"), a smart phone, a tablet, a laptop computer, or a desktop computer, can be operable to advise a user of surveillance system camera activation, identify a cause or causes of the event, whether audio or motion, and to provide an output to the computer device in which the audio portion has been modified based upon the classification and location of the triggering event. The system may, if desired, be used in a network-based security/surveillance system that detects a triggering event, such as a motion and/or audio detection, to initiate recording for data capture. The system can be implemented over a Local Area Network (LAN) and/or a Wide Area Network (WAN).

Another aspect of the present invention provides a method for electronic monitoring including a first step of detecting a triggering event within the field of view of an imaging device comprising at least one of a motion and a sound and using an imaging device for recording an area corresponding to the triggering event. Then, determining whether the triggering event is a classified triggering event and, if so, an output to a user device including the video component captured from the imaging device and a modified audio component.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
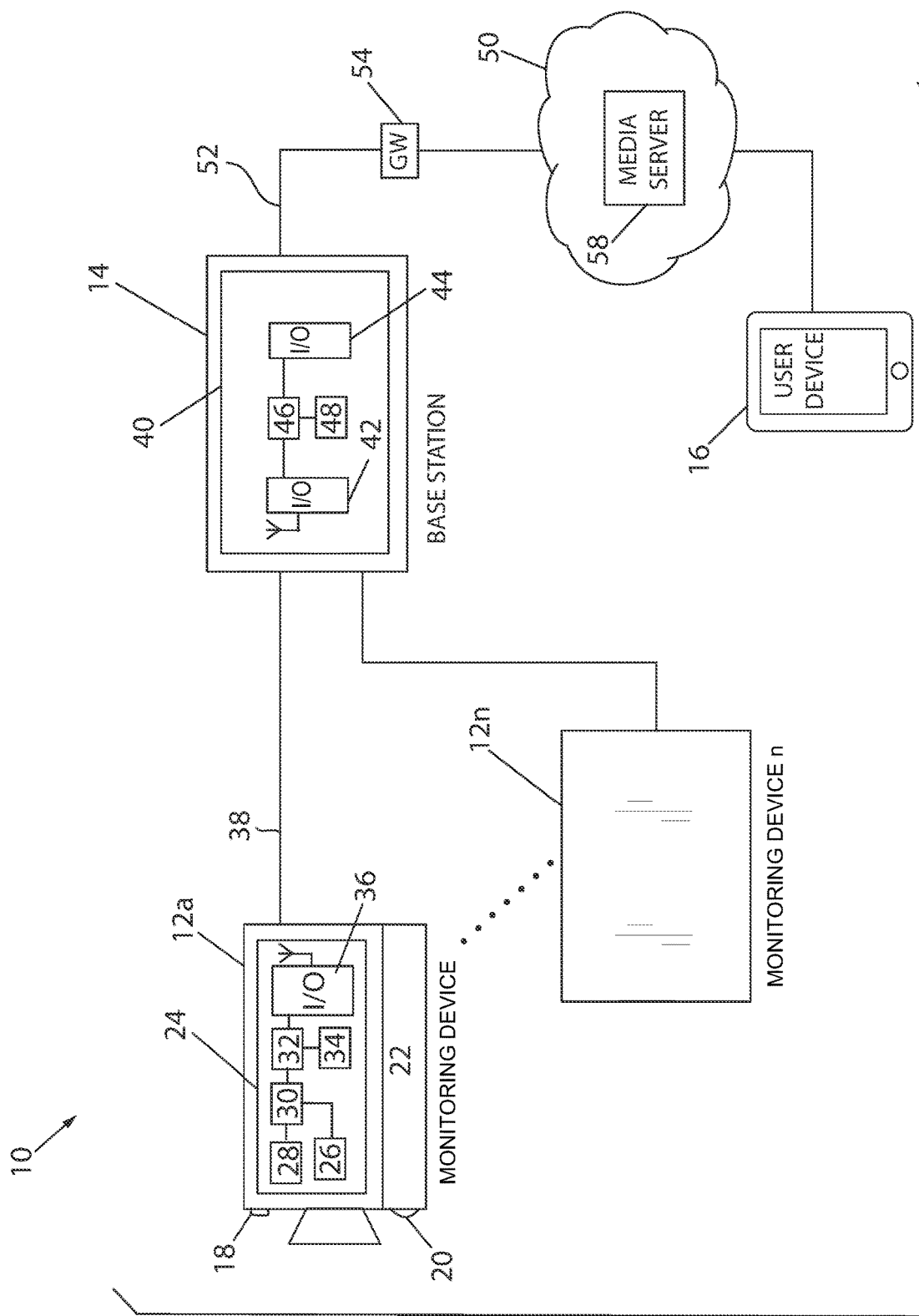
FIG. 1 is a block diagram of a system for electronic monitoring in which detection of a triggering event by a monitoring device can implement an instruction to modify an audio output in accordance with an aspect of the invention.

Referring now to FIG. 1, in accordance with an aspect of the invention, an electronic system 10 for real-time monitoring can include one or more monitoring devices 12 and a hub or base station 14. A number "n" 12a-12n images devices are schematically illustrated in FIG. 1. One or more user devices 16 such as a smart phone, tablet, laptop, or PC communicating with the base station 14. Each user device includes a display that typically includes both an audio display and a video display, internal computing and storage capabilities, and a program or application servicing as a user interface with the remainder of the system 10.

Each monitoring device 12 is configured to acquire data and to transmit it to the base station 14 for further processing and/or transmission to a server and/or the user device(s) 16. Each monitoring devices 12 may be battery powered or wired. One or more of the monitoring devices may be configured to detect one or more types of conditions or stimulus, for example, motion, opening or closing events of doors or windows, sounds such as breaking glass or gunshots, the presence of smoke, carbon monoxide, water leaks, and temperature changes. One or more the monitoring devices 12 may comprise an imaging device may, in which case the acquired data typically will correspond to a video image and an audio recording. In this case, each imaging device may be or include a camera such as a video camera 24. Several such monitoring devices may be mounted around a building or other structure or area being monitored. For example, in the case of a residential home, monitoring devices, most typically imaging devices, could be mounted by each entrance and selected windows. An imaging device or other monitoring device 12 also could be incorporated into or coupled to a doorbell, floodlight, etc.

Still referring to FIG. 1, one or more of the imaging devices or other monitoring devices 12 may also include a microphone 18 for capturing the audio recording, visible and/or infrared (IR) lights 20, a power supply 22, and/or monitoring device electronic circuitry 24. Circuit 24 may include an imager 26, an audio circuit 28, a media encoder 30, a processor 32, a non-transient memory storage 34 and/or a wireless I/O communication device 36, among other things. Each monitoring device 12 can be in communication with the base station 14 through a network such as a private Wireless Local Area Network (WLAN) 38, hosted by the base station 14 operating as an access point. One such network is an IEEE 802.11 network.

Still referring to FIG. 1, the hub or base station 14 can include base station electronic circuitry 40, including a first wireless I/O communication device 42 for communicating with the monitoring devices 12 over the WLAN 38, a second wired or wireless I/O communication device 44 for accessing the Wide Area Network (WAN) 50, such as the Internet through a Local Area Network (LAN) 52 connected to a gateway and/or router 54, a processor 46 and/or a non-transient memory storage 48, among other things. It should be apparent that "circuity" in this regard can comprise hardware, firmware, software, or any combination thereof. In one aspect, the monitoring devices 12 could be Arlo® cameras, and the base station 14 could be an Arlo® base station, each available on a stand-alone basis or as part of any of a number of systems available from Arlo Technologies, Inc. of Carlsbad, California.

The base station 14 may also be in communication with a sever 58, which may be a cloud-server accessible via the WAN 50. The server 58 can include or be coupled to a microprocessor, a microcontroller or other programmable logic element configured to execute a program. This program, while operating at the server level, may be utilized in filtering, processing, categorizing, storing, recalling and transmitting data received from the monitoring device 12 via the base station 14.

In operation, each monitoring device 12 can be configured, though suitable mounting of the monitoring device 12 and/or through suitable manipulation of its controls, to monitor an area of interest, such as a part of a building or section of property.

The discussion that follows is directed to a monitoring device in the form of the imaging device 12(*a*) as a non-limiting example.

Imaging device 12(*a*) may be commanded to capture an image and corresponding audio either automatically upon detection of a triggering event or through the transmission of a command from a user device 16. An image and corresponding audio signal also may be captured automatically upon detection of a triggering event detected by a detector. The triggering event may be motion, and the detector may be a motion detector. Instead of or in addition to detecting motion, the detector could include an IR sensor detecting heat, such as the body heat of an animal or person. The triggering event also could be sound captured by the included microphone 18. In this case, the triggering event may be a sound exceeding a designated decibel level or some other identifiable threshold sufficient to initiate a capture of audio and video at the imaging device 12(*a*). Upon receiving notification from an imaging device 12(*a*) of a triggering event, the system 10 can generate alerts such as push notifications ("PN"), to send an alert or PN to one or more user devices 16 for indicating the triggering event, thereby alerting a user to the occurrence of the triggering event, whereupon the user may access an output transmitted to the user device 16, typically including a video component and an audio component if the monitoring device is an imaging device.

Whether imaging device operation is triggered by a command from a user device 16 or by detection of a triggering event, the camera 24 can then capture a raw video stream which, in turn, can be provided to the media encoder 30 for producing video packets in an encoded video stream. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream. Under control of the processor 32 executing the program, the encoded media stream can be transmitted from the wireless I/O communication device 36 within the imaging device 12(*a*) to the base station 14 via WLAN 38.

Figure 2:
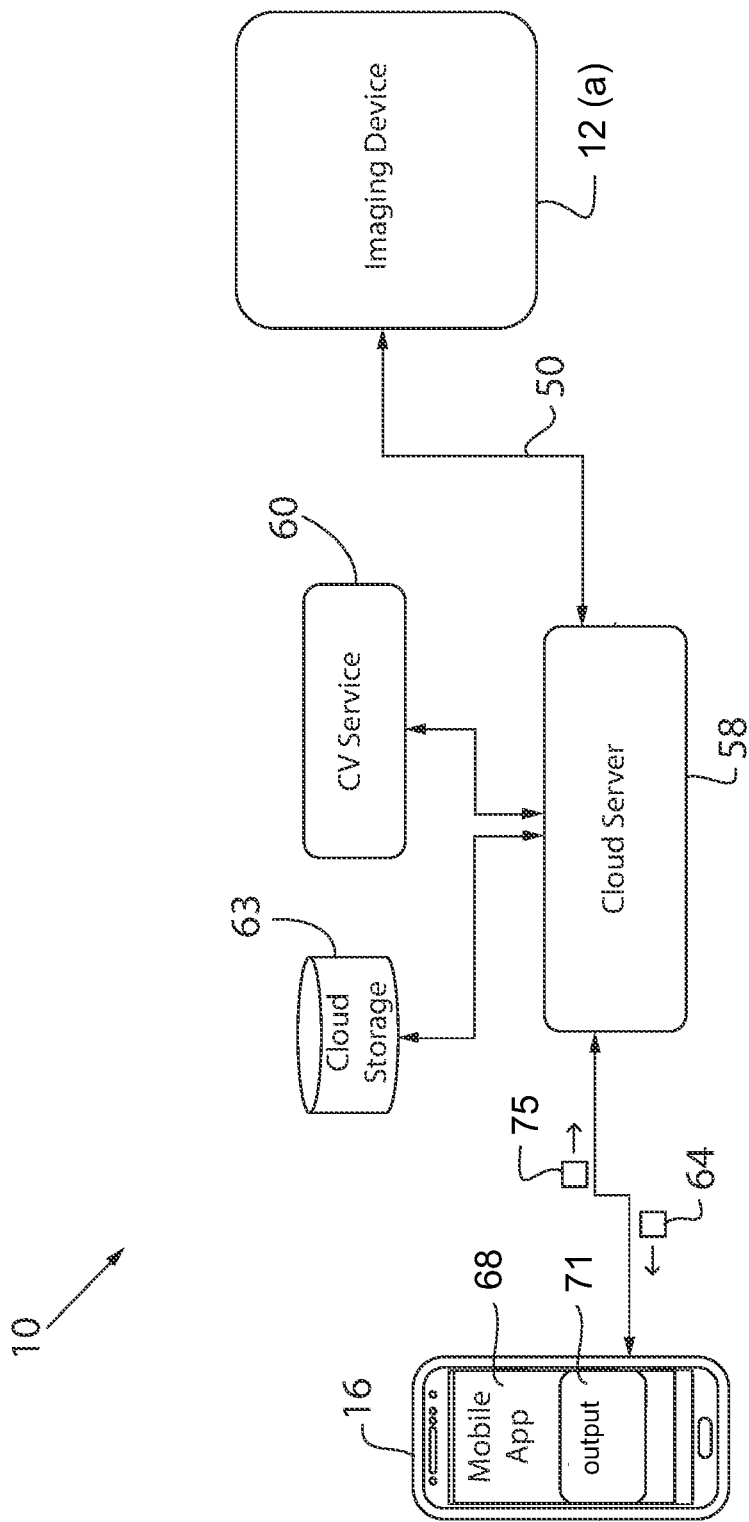
FIG. 2 is a block diagram of a system configuration for generating modified audio output in response to detecting a classified triggering event in the electronic monitoring of FIG. 1, in accordance with an aspect of the invention.

The media stream may then be transmitted either directly from the imaging device 12(*a*) or indirectly via the base station 14 via the WAN 50 to a remote data storage device 63 in communication with a media server 58, for data storage in the form of a recording, as shown in FIG. 2. The storage device 63 may be a cloud-based storage device, and the media sever 58 may be a cloud server accessible via a wireless connection 50. The server 58 can include or be coupled to a microprocessor, a microcontroller or other programmable logic element (individually and collectively considered "a controller") configured to execute a program. The controller may be contained in whole in the base station 14 or the server 58. Alternatively, interconnected aspects of the controller and the programs executed by it could be distributed in various permutations within the imaging device 12(*a*), the base station 14, the user device 16, and the server 58. This program may be utilized in filtering, processing, categorizing, storing, recalling, modifying and transmitting data received from the imaging device 12(*a*) via the base station 14. Server 58 may also communicate with or include a computer vision program 60 ("CV"), which can apply one or more filters or processes, such as edge detection, facial recognition, motion detection, etc., to detected one or more characteristics of the recording such as, but not limited to, identifying an individual, animal, vehicle, or package present in the media stream.

Figure 4:
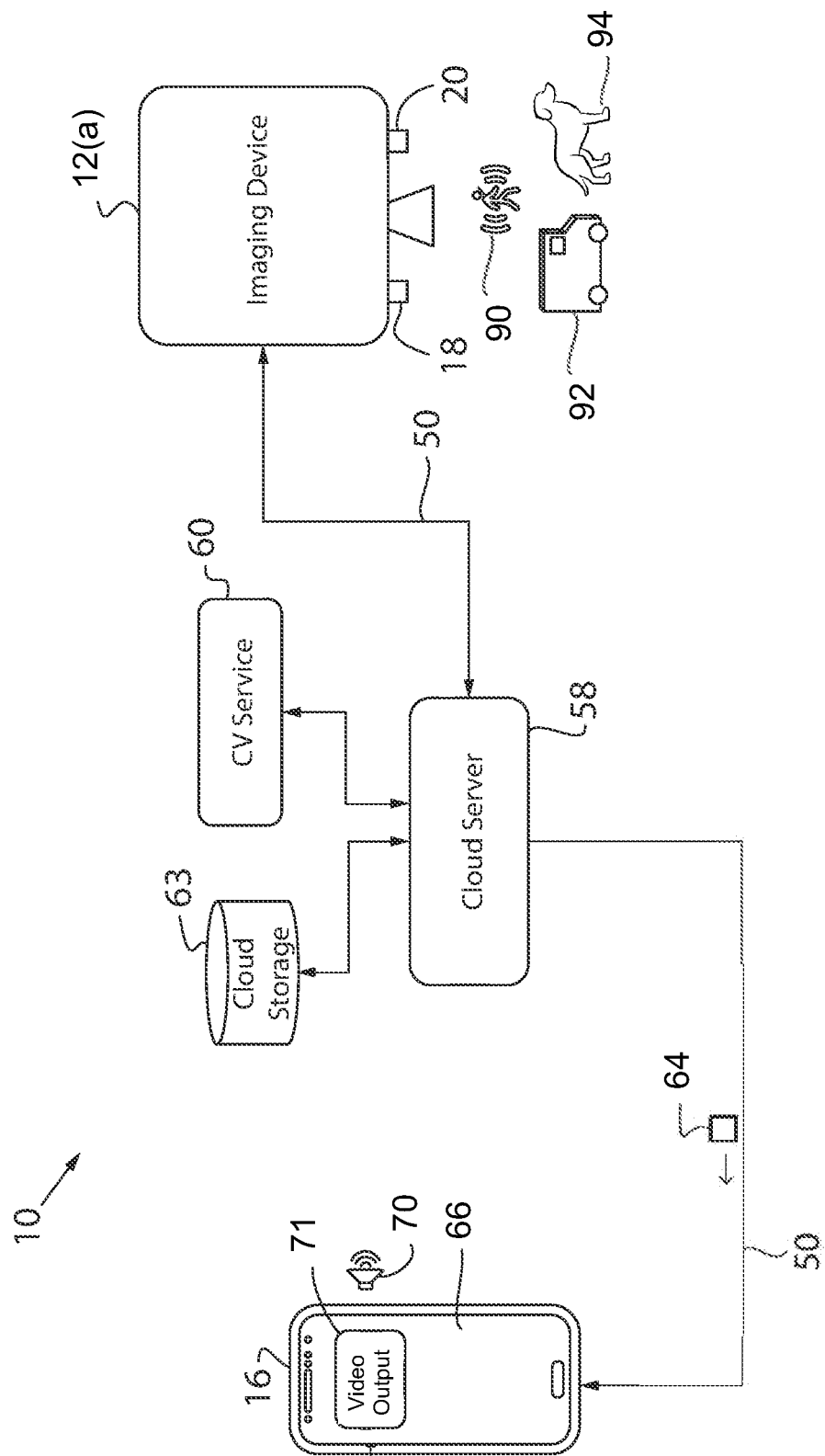
FIG. 4 is a block diagram of a system generating a modified audio output in response to detecting a classified trigger event of an imaging device in the electronic monitoring of FIG. 1, in accordance with an aspect of the invention; and, FIG. 5 is a flow chart for generating the modified audio output according to the system of FIG. 4.

Still referring to the block diagram of FIG. 2, upon receiving notification from an imaging device 12(*a*) of a triggering event, e.g., visual movement or sound, and/or identification of the triggering event classification, e.g., person, animal, vehicle, or package present in the recording, provided by the CV 60, the server 58 may generate an alert such as a push notification ("PN") to one or more user devices 16 for indicating the occurrence of a triggering event having been detected within the field of view of the imaging device 12(*a*). An output signal 64 can then be transmitted from the server 58 and displayed on the user device 16, including a visual component 71 and/or an audio component 70, as shown in FIG. 4. As will be described in further detail below, identification of a triggering event as a classified triggering event as either a genius or species level triggering event may initiate modification of the audio component of the output signal that is transmitted to the user device 16 and broadcast from a speaker of the electronic device 16. The identification may include a taxonomic-based classification that identifies a specific genus or species of an object, and/or a user-based classification that identifies the occurrence of the triggering event in a user-defined activity zone. In one example, the audio component is modified only if the triggering event is categorized as both a taxonomic-based triggering event and as occurring within a user-defined activity zone.

In one embodiment, the push notification can operate as a pop-up message pushed to the user device 16 that can be displayed via an operating system of the user device 16 to the touchscreen I/O of the user device 16. This can allow a user to quickly view the video component and hear the modified audio component of the classified triggering event without requiring the user device 16 to execute a dedicated application program. Alternatively, the push notification can operate as link to open a dedicated application program 68 located within the user device 16, through which the user can view the video component 71 and hear the modified audio component 70 of the classified triggering event on the user device 16.

Figure 3:
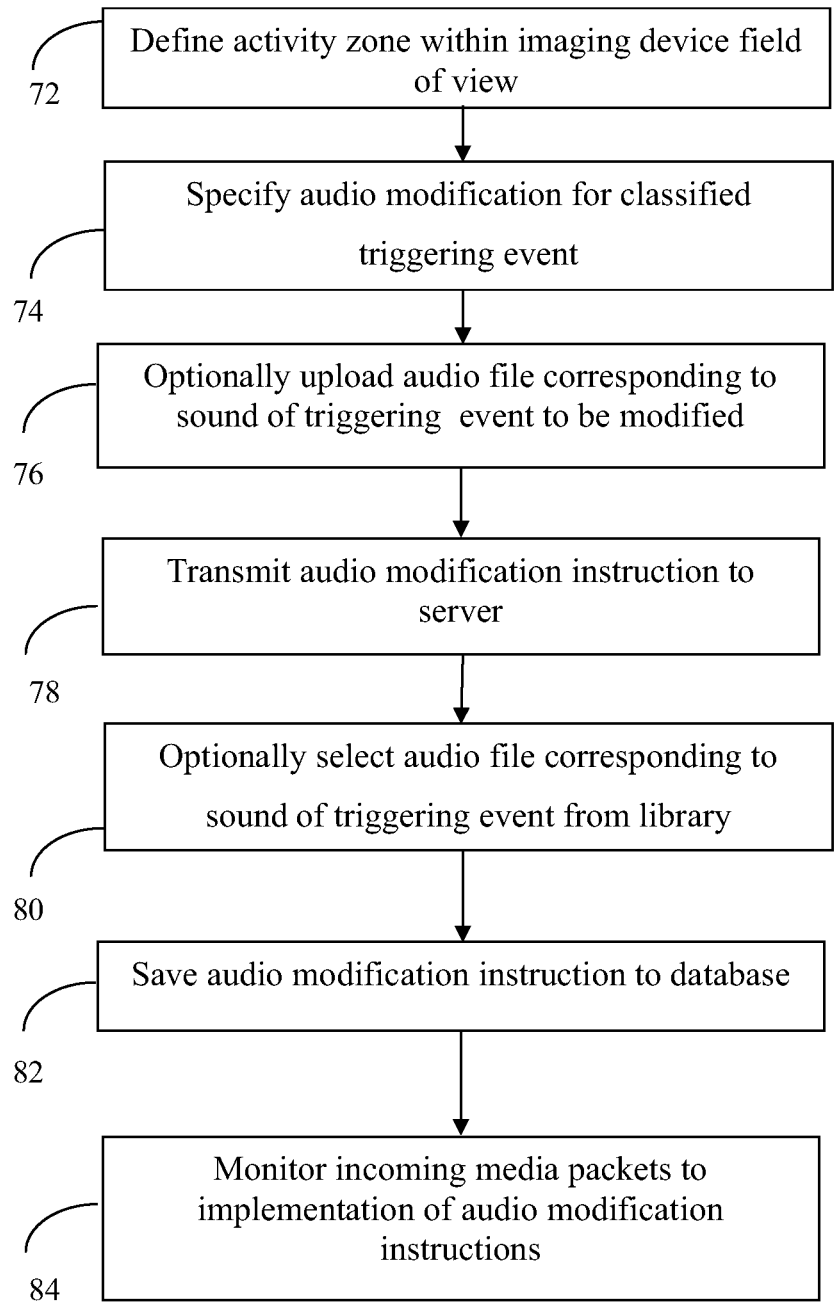
FIG. 3 is a flow chart for configuring the modified audio instruction according to the system of FIG. 2.

Still referring to FIG. 2, and now referring also to FIG. 3, which is a corresponding flow chart for one embodiment of configuring a subsystem of the system 10 to generate a modified audio component 70 of an output 64 in response to classified triggering event occurring within a specified activity zone is shown. Initially at block 72, a user of system 10 will access an activity zone module within a mobile app 75 that is operating on the user device 16, which is configured to control the system 10 and those imaging devices 12(*a*) contained thereon. Within the activity zone module, the user may specify one or more activity zones within the field of view of one or more imaging devices, such as device 12(*a*). One way to identify an activity zone is to overlay a digital boundary or boarder over the field of view of the given imaging device 12(*a*) to create a geofenced area. That area may be all or only a portion of the field of view. Once specified, the activity zone will allow the CV 60 of system 10 to determine if a sensed triggering event, such as motion, has occurred within the activity zone or elsewhere within the field of view of the imaging device 12(*a*) or within the monitored zone of one or more other monitoring devices.

It should be noted that activity zone delineation/identification is not critical to the invention, and the audio modification techniques described herein apply equally to a system in which the entire field of view of the imaging device is always utilized for audio analysis.

At subsequent block 74, a user of the system 10 will then access an audio module within the mobile app 75 that is operating on the user device 16 and generate an instruction. Within the audio module, the user can specify an audio modification 70 that is to be applied to the output 64 transmitted to the user device 16 in response to the detection of a specific classified triggering event within the specified activity zone of the imaging device's 12(*a*) field of view, which is customized according to the nature or classification of the triggering event. For example, the imaging device 12(*a*) may sense, within the boundaries of the activity zone, a triggering event that is categorized at the genus level. Such genus level categorized triggering event may include: motion detection of a generic or unspecified object. The object may be, for example, a person, a vehicle, an animal, or a sound. Furthermore, such triggering event may be detected and categorized directly by the imaging device without the need for server level integrated computer vision processing via CV service 60. However, it is also considered within the scope of the present invention that some genus level categorized triggering events, such as but not limited to human person detection, vehicle detection and animal detection may require computer vision processing either at a via CV service 60 located at the server 58 or base station 14.

In addition to taxonomic-based categorized triggering events, specification of the audio modification 70 that is applied to the output 64 and transmitted to the user device 16 in response to a specific classified triggering event occurring within the user-defined activity zone, in block 74, may be further customized according to one or more triggering events that is categorized at a species level, which is to say a unique triggering event relative to a common genus category. Objects capable of causing such species level categorized triggering events may include: a specific individual person detected by, for example, facial recognition, retinal identification, voice identification, walking gait identification, etc.; a specific vehicle detected by identification of, for example, vehicle license plate number, vehicle profile, vehicle marking/signage identification etc., a specific animal such as family pet detected, for example, by comparison of the image to a stored image of the pet; and package drop-off and pick-up detection that can be detected by recognition of common package shape and size. It should again be understood that the listing of triggering events and the associated objects categorized at the species level, provided above, are representative examples offered by way of non-limiting example. Furthermore, while such triggering event identification and categorization may be detected via computer vision processing, it should be understood that such CV based identification may occur either at a CV service 60 in communication with the server 58, or alternatively within the hub or base station 14 prior to transmitting the media packets to the server 58.

More specifically, at block 74, using the audio module, the user generates an instruction using app 75 to apply an audio modification 70 to the output 64 to be played from the user device 16 in response to the triggering event being a classified triggering event occurring within the activity zone. For example, in the instruction, the user may choose to mute, i.e., reduce volume to 0%, the audio component of the output 64 when the triggering event is classified as identifying a specific animal, such as a pet dog (a species level category) within the user specified activity zone, such as a fenced portion of a yard that is within the field of view of the imaging device 12(*a*). Identifying the particular animal via CV 60 recognition may include the entry of the pet's name via text input with the instruction in app 75, for example "SPOT", and forming a correlation between that identified name and an uploaded image or video recording of the specific dog. Similarly, identifying the imaging device, e.g., camera, may include the entry of text input at the audio module, for example "BACK YARD", to identify the location of the camera. In one embodiment of the present invention, the addition of one or more imaging devices 12(*a*) to an existing system 10 may include a request that newly added devices 12(*a*) be provided with a name via text input. Such updates to the system may result in updating the preexisting custom audio modifications 70 to also include such modifications occurring in activity zones within the field of view of the newly added imaging device 12(*a*).

At optional subsequent block 76 the user may further utilize the audio module of the mobile application 68 to additionally provide a custom audio file corresponding to the audio component 70 that is subject to modification in the output 64. In the non-limiting example of FIG. 3, the custom audio file may include an audio recording of the barking of the pet dog identified as "SPOT". The custom audio file provided at block 76 may be, but is not limited to, an .mp3 format file that is generated using a microphone incorporated in the user's mobile device 16, a prerecorded audio file that is uploaded to the mobile application 68 or selected from a prior audio recording from an imaging device 12(*a*) of the system.

At subsequent block 78, the audio modification instruction, which includes the selections input by the user at blocks 72 and 74, e.g., identified triggering event, identified activity zone and audio modification, are transmitted to the server 58. In the event that the user has elected to include a custom audio file at optional block 76, the custom audio file is also included within the audio modification instruction. The instruction in app 75 may also include additional user input data such as the uploaded image or video recording of the pet.

At block 80, and in the event that the user has not elected to include a custom audio file in prior block 76, a generic audio file, such as but not limited to an .mp3 format file may be selected from a prepopulated audio file library stored at the remote data storage device 63 in communication with a media server 58. By way of example, in the context of the non-limiting example of FIG. 3, the generic audio file may include an audio recording of a barking dog.

At subsequent block 82, the audio file, either custom provided at block 76 or selected from a provided library at block 78, is then saved at the remote data storage device 63 in communication with a media server 58 along with the instruction to apply the user specified audio modification, i.e., instruction to mute or reduce at least a portion of the volume, when the triggering event is classified identified as occurring within the specified activity zone.

Once configuration of the instruction has been completed, at block 84 the CV 60 will analyze incoming media packets, including audio and video data, to determine whether the triggering event meets the taxonomic-based classification criteria and occurred in the user-defined activity zone and, if so, to apply the audio modification instruction to the output 64 as applicable. While implementation of the instruction will be described in further detail below, and specifically in reference to FIGS. 4 and 5, by way of brief example, in the context of the non-limiting example of FIG. 3, in the event that the CV 60 classifies the motion occurring within specified activity zone, i.e., fenced portion of back yard, as the user selected classified triggering event, i.e., presence of pet dog "SPOT", the incoming audio portion of the media packet will be compared against the recorded audio file of a dog barking, and the instruction 75 to "MUTE" the corresponding portion of the audio will be applied to the output 64. As a result, the output 64 received at the user device 16 will include a modified audio component, such that the portion of the audio identified by the program as corresponding to a dog barking will be muted, in accordance with the instruction.

While the nonlimiting example illustrated in FIG. 3 provides a flow chart for one embodiment of configuring the system 10 to modify the audio component 70 of an output 64 in response to receiving a corresponding instruction within the app 75, it should be understood that alternative configurations are well within the scope of the present invention. For example, in one embodiment, the audio modification instruction may specify the occurrence of one or more of the genus and species level classified triggering events either within or without of the activity zone. Accordingly, upon receipt of the media packets at the CV 60, taxonomic-based identification of both a genus and species level classified triggering events may be required before the audio modification instruction is executed by the system 10. By way of another nonlimiting example, if an imaging device 12(a) has a field of view including a lumber yard and a user wanted to decrease the volume of a forklift that commonly drove through the yard, the corresponding instruction may require the presence of both genus level motion detection of a vehicle and species level identification of a forklift vehicle profile before applying the reduction in volume of sounds corresponding to the forklift in the modified audio component 70 of the output 64. To this end, it should be understood that modifying the audio component 70 of an output 64 in response to receiving a corresponding instruction in accordance with an embodiment of the present invention may be formed for any combination of a triggering event occurring within or relative to an activity zone, with one or more classified triggering events, be they genus level and/or species level.

Figure 5:
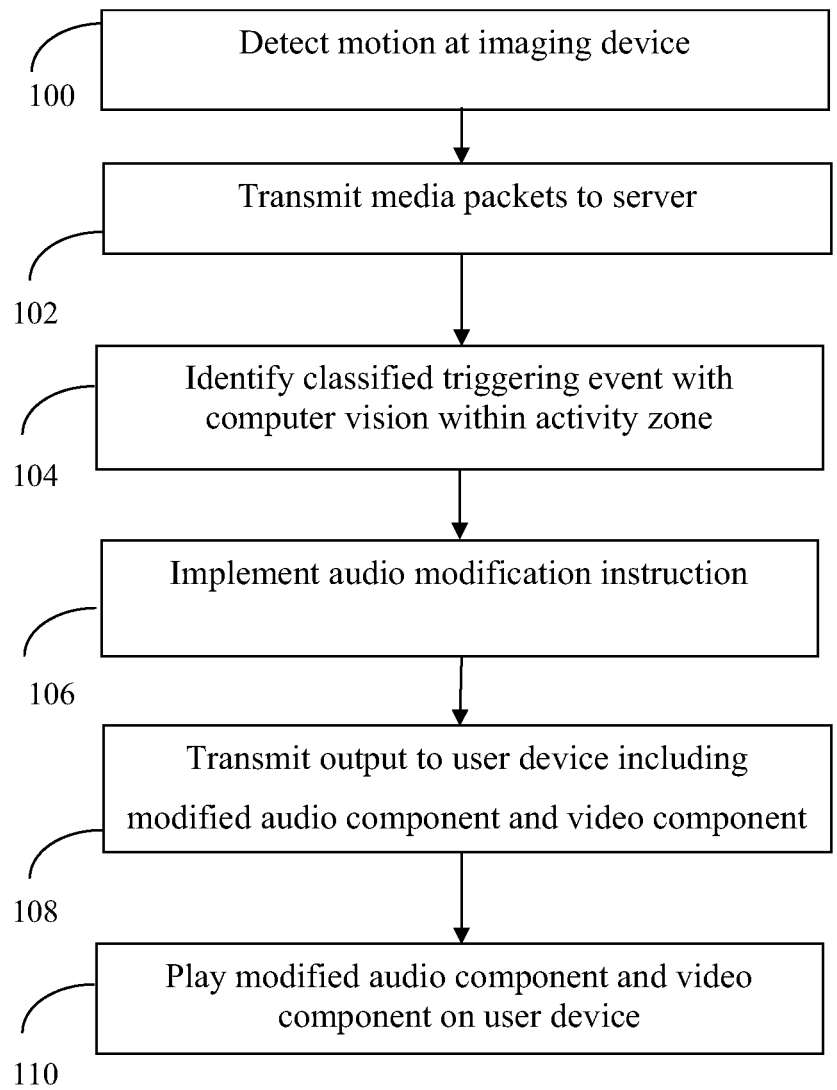

Turning now to FIGS. 4 and 5, the playback of modified audio component 70 of the output 64, as a subsystem of the general system 10, will now be described in further detail. Referring initially to FIGS. 4 and 5, a schematic view and a corresponding flow chart for one embodiment of playback of a modified audio alert 70 within the system 10 in response to receiving a corresponding instruction within the app 75 is shown. Following the initialization of the system 10, its imaging device 12(a), and the configuration of output 64 including the modified audio component 70 via an instruction in app 75, the imaging device can begin monitoring areas for triggering events at block 100. The imaging devices 12(a) can monitor for both genus and species level categorized triggering events, such as motion or sound produced by an object 90, 92, or 94 in FIG. 4. Monitoring may be performed, for example, using, microphones 18 and/or motion sensors 20 of the imaging device 12(a) in various configurations, including as described above with respect to FIG. 1. The monitoring without additional action can continue in a continuous loop so long as no triggering events are detected. However, if an imaging device 12(a) detects a triggering event, for example motion of an object 90, 92, or 94, at block 102, the imaging device 12(a) can begin capturing and recording data from the area corresponding to the triggering event at subsequent block 104, where the image and sound collected by the imaging device 12(a) are transmitted as media packets over the WAN 50 to the server 58 from the imaging device 12(a) and/or base station 14.

Next, at block 106, the system 10 may process the media packets to identify and classify the triggering event contained therein. As described above, the media packets may be processed by the CV 60 that is in communication with the server 58 through network 50, such as a cloud-based server 58 and corresponding cloud-based CV 60 service. Alternatively, the processing of the media packets to identify and classify the triggering event may occur directly in the base station 14, prior to the media packets being received at the server 58. In either embodiment, the imaging device 12(a), which detected the triggering event, can then determine whether a triggering event is still being detected. In one aspect, this can be accomplished by continuously monitoring for triggering events over a particular interval and concluding that a triggering event is no longer being detected if a triggering event does not occur within the interval. In another aspect, this can be accomplished by monitoring for a second triggering event after a predetermined time period and concluding that a triggering event is no longer being detected after expiration of that time period. If a triggering event continues to be detected, the imaging device 12(a) can be instructed to continue capturing, recording, and transmitting at block 104, so long as a triggering event continues to be detected. In addition to determining the duration of the triggering event, the processing of the media packets at block 94 further comprises the identification, i.e., classification of the triggering event. For example, at block 104, the CV 60 may identify the presence of one or more genus level triggering events (unspecified motion or detection, human 100 person detection, vehicle 102 detection, package 104 detection) and/or one or more species level triggering events (specific individual person detection, specific vehicle detection, specific animal detection, package drop-off and pick-up detection). If activity zones are utilized, the CV 60 may further identify the occurrence or location of the one or more genus or species level triggering events relative to the user defined activity zone, which may define a subset of a field of view of an imaging device 12(a). By way of continuing the non-limiting example provided above in the discussion of FIGS. 2 and 3, the system 10 at block 104 may identify the motion of an animal 92 as a genus level triggering event. More specifically, the system 10 at block 104 may identify the animal 92 via artificial intelligence (AI) imaging recognition, i.e. a species level triggering event, as the particular animal correlating to the pet dog name "SPOT" as was previously entered by the user during the initial configuration block 72, from FIG. 2. As mentioned above, intermediate levels of triggering events also could be detected such as motion of not simply an animal generally, but a specific type of animal, e.g., dog, cat, racoon, squirrel, in the absence of identifying a particular animal by name.

Having now identified and classified the triggering event and, possibly, its occurrence within the activity zone with the CV 60, at subsequent block 106 the system 10 may proceed to implement the audio modification instruction. The audio modification instruction is preferably stored to the remote data storage device 63 in communication with a media server 58, but may be stored and implemented at the user device 16, imaging device 12(*a*), and/or base station 14. As such, the audio modification instruction may be implemented by a program operating on the server 58 through network 50, such as a cloud-based server 58. Alternatively, the audio modification instructions, or a portion thereof, may be implemented by a program operating directly in the imaging device 12(*a*), base station 14 and/or user device 16. In generating the modified audio component 70 of the output 64, the system 10 utilizes the classified one or more triggering events, e.g., the identification of the pet dog that has been verified via image recognition and, potentially, the identification within the activity zone of a given imaging device 12(*a*), to implement the corresponding instruction and access the corresponding custom or general audio file, e.g. a dog barking, such that the incoming audio portion of the media packet may be compared against the recorded audio file of a dog barking, and the instruction to "MUTE" the corresponding portion of the audio will be applied to the output 64. As such, the output 64 generated at block 96 through the implementation of instruction includes the rule to modify the audio component of the output 64 according to the instruction. The modification of the audio output 64 may take the form of muting, i.e., decreasing the volume to 0%, for the portion of the audio that is corresponds with the audio file stored with the instruction. Alternative audio modification instructions may include, but are not limited to, increasing or decreasing the relative volume of the audio that corresponds with the audio file stored with the instruction, muting all audio components that do not correspond to the audio file stored with the instruction, and increasing or decreasing portions of the audio that do not correspond with the audio file stored with the instruction. In the context of muting the audio component entirely, the system 10 may implement such an instruction at block 106 by either deactivating the microphone 18 at the imaging device, eliminating the audio component 70 of the output 64 sent to the user device, or reducing the volume of the audio component 70 of the output. In the context of modifying the audio component 70 of the output 64, such a modification may be applied to prerecorded media packets as well as live-feed media packets. Still further, it is also considered within the scope of the present invention that the instruction may also include deactivation of the video capture or video component of the output 64 in addition to modification of the audio component 70.

At block 108, the output 64 with a modified audio component 70 is transmitted via WAN 50 or cellular network from the server 58 to the user device 16. While FIG. 4 illustrate a single recipient user device 16 receiving the output 64, it should be understood that the present invention is not so limited and that multiple users and or multiple user devices 16 may be present in the system 10 to receive the output 64. Furthermore, it should be understood that the multiple outputs 64 may be generated from distinct user device specific instructions to generate distinct audio modified components 70 at one or more user devices 16 in response to the same single or combination of triggering events. For example, two users of the same system 10 may request different instructions from their corresponding apps 75 for the same classified triggering event, resulting in the generation of two or more distinct outputs 64 with differing audio modifications 70 played at their corresponding user device 16 in response to the same triggering event. Accordingly, the system 10 may generate multiple distinct outputs 64 in response to the same single or combination of triggering events and transmit the different outputs 64 to individual user devices 16 or groups of user devices 16.

At the final block 110, when the output 64 is received at the user device 16, the instruction for play of the video component 71 and modified audio component 70 of the output 64 will be played from the user device 16. The modified audio component 70 will be played from a speaker of the user device 16. For example, the portion of the audio identified by the program as corresponding to a dog barking will be muted, in accordance with the instruction.

In the event the audio modification instruction was implemented through the selective decrease in volume of all or a portion of the audio packets received by the server 58, the user may selectively override the audio modification at the user device 16 by electing to playback the entire audio component 70, in an unmodified form. However, such an override would only be available if the instruction was implemented by a selective decrease in volume of all or a portion of the audio packets received by the server 58. That is to say if the instruction had been implemented by alternatively deactivating the microphone 18 at the image sensor, the user override instruction would not simply increase the volume of the modified portion of the audio component 70, but would rather require reactivation of the microphone 18 entirely.

In another nonlimiting example of the generating an output 64 having a modified audio output 70 within the system 10, the triggering event detected at the imaging device 12 may include the detection of an unknown animal (a genus level categorized triggering event) and a preselected portion of the field of view of the image sensor 12, i.e., an activity zone such as a patio. The resultant modified audio output 70 generated and played in response to the instruction may mute or decrease the volume of all audio components, but for those occurring within the activity zone. Such an instruction may include the user of an AI engine at the server 58, in communication with the WAN 50, to apply audio modification to those sounds associated with motion detected within specific areas within the field of view of the imaging device. Furthermore, use of one or more directionally aware microphones 18 or multiple imaging devices 12, each with one or more microphones 18 may be utilized to directionally identify the origin of specific sounds for selective audio modifications.

In still another nonlimiting example of the generating an output 64 having a modified audio output 70 within the system 10, the instruction in the app 75 may specify the modification of audio within or beyond a distance range from the imaging device 12. In such an embodiment, the location of the triggering event detected at the imaging device 12 may be determined by AI based motion analysis at the server 58, the use of object reference detection in the field of view of the imaging device 12 or a user-defined activity zone.

Furthermore, it should be understood that through use of the system 10, additional sounds samples may be recorded by the imaging devices 12 to further enhance and modify the prepopulated audio file library stored at the remote data storage device 63 in communication with a media server 58. Such modification will allow the AI engine at the server 58 or in conjunction with the CV 60 to further customize audio modification to those sounds frequently observed within a given system 10 and allow the system 10 to become increasingly personalized to the audio environment in which it is deployed.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic monitoring system comprising:
   an imaging device having a field of view configured to detect an at least one triggering event comprising at least a first sound and a motion and to capture data corresponding to the triggering event; and
   a controller in communication with the imaging device, the controller executing a program stored in a non-transient medium and being operable to categorize the at least one triggering event and to locate the at least one categorized triggering event relative to a user defined activity zone within the field of view of the imaging device and to send an output to a first user device upon the imaging device detecting the at least one categorized triggering event, wherein
   the output comprises a video component and an audio component, and wherein a volume of at least a portion of the audio component is modified when the triggering event is a categorized triggering occurring within the user defined activity zone.

2. The system of claim 1, wherein the program is operable to mute at least a portion of the audio component when the triggering event is a categorized triggering event occurring within the user defined activity zone.

3. The system of claim 1, wherein the program is operable to decrease a volume of at least the first sound in the audio component of the output to a level between the then-prevailing volume and a full-mute when the triggering event is a categorized triggering occurring within the user defined activity zone.

4. The system of claim 1, wherein the imaging device is configured to detect and capture a second sound, and wherein the program is operable to alter a volume of the second sound in the audio component of the output when the triggering event is a categorized triggering occurring within the user defined activity zone.

5. The system of claim 1, wherein the categorized triggering event comprises one or more of the detection of an unspecified person, detection of an unspecified vehicle, detection of an unspecified animal, detection of unspecified motion, or detection of an unspecified sound.

6. The system of claim 1, wherein the categorized triggering event comprises one or more of the detection of a specified person or a designed class of people, detection of a specified vehicle or vehicle type, detection of a specified animal or animal species, detection of a package, detection of a specified sound, or detection of a specified motion.

7. The system of claim 6, wherein the program is operable to access an audio file from a database associated with the categorized triggering event and to modify the volume of the portion of the audio component when the first sound corresponds to the accessed audio file.

8. The system of claim 7, further comprising a microphone at the first user device, and wherein the system is configured to generate the audio file from a sound recorded using the microphone.

9. The system of claim 7, wherein the audio file obtained from a library of prerecorded sounds.

10. The system of claim 1, wherein the program is operable to categorize triggering events occurring during a specified time period.

11. The system of claim 1, wherein the user defined activity zone has a user-defined boundary defined by at least one of a distance from the imaging device and a geofenced area located at least partially within a field of view of the imaging device.

12. The system of claim 1, further comprising a second user device configured to receive the output, wherein the portion of the modified audio component received at the first user device differs from the portion of the modified audio component received at the second user device.

13. The system of claim 1, wherein at least a portion of the video component is modified when the triggering event is a categorized triggering occurring within the user defined activity zone.

14. An electronic monitoring system comprising:
   an imaging device having a field of view configured to rely on motion detection to detect at least one triggering event and to capture data corresponding to the triggering event; and
   a controller in communication with the imaging device and a microphone, the controller executing a program stored in a non-transient medium and being operable to (i) activate the microphone to capture an audio component originating within the field of view of the imaging device in response to detection of the at least one triggering event, (ii) determine whether the triggering event is a classified categorize the at least one triggering event based using a captured image and (iii) send an output to a first user device upon the imaging device detecting the at least one categorized triggering event, wherein
   the output comprises a video component and the audio component, and wherein
   the controller is configured to determine whether the triggering event is a classified triggering event and, if so, to cause a volume of at least a portion of the audio component of the output associated with the triggering event to be modified.

15. The electronic monitoring system of claim 14, wherein determining whether the triggering event is a classified triggering event comprises determining whether the triggering event occurs in a user-defined activity zone within the field of view of the imaging device.

16. The electronic monitoring system of claim 14, wherein a classified triggering event is defined as a taxonomic-based triggering event generated by a specified genus, sub-genus, or species of objects as recognized by the video component of the monitoring device.

17. The electronic monitoring system of claim 14, wherein the categorized triggering event comprises one or more of a specified person or a designed class of people, a specified vehicle or vehicle type, a specified animal or animal species, detection of a package, and detection of a specified motion.

18. A method for electronic monitoring comprising:
   (a) detecting a triggering event comprising at least one of a motion and a sound occurring within the field of view of an imaging device;
   (b) upon detecting the triggering event, capturing and recording data using the imaging device;
   (c) determining whether the triggering event is a categorized triggering event;
   (d) if the determined event is a categorized triggering event, identifying the occurrence of the categorized triggering event relative to a user-defined activity zone within the field of view of the imaging device;
   (e) transmitting an output to a user device, the output comprising a video component and component; and
   (f) modifying the audio component if the triggering event is a categorized triggering occurring within the predefined activity zone.

19. The method of claim 18, further comprising modifying a volume of at least a portion of the audio component of the output when the triggering event is a categorized triggering occurring inside the predefined activity zone.

20. The method of claim 19, wherein modifying the volume further comprises muting the portion of the audio component when the triggering event is a categorized triggering occurring inside the predefined activity zone.

* * * * *